US012589662B2

(12) United States Patent
Jeon

(10) Patent No.: US 12,589,662 B2
(45) Date of Patent: Mar. 31, 2026

(54) BATTERY MODULE COMPRISING TERMINAL BLOCK WITH SHIELDING PORTION

(71) Applicant: Samsung SDI Co., Ltd., Yongin-si (KR)

(72) Inventor: Doosung Jeon, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 766 days.

(21) Appl. No.: 17/822,945

(22) Filed: Aug. 29, 2022

(65) Prior Publication Data

US 2022/0402374 A1      Dec. 22, 2022

Related U.S. Application Data

(63) Continuation of application No. 16/319,114, filed as application No. PCT/KR2017/007642 on Jul. 17, 2017, now Pat. No. 11,427,093.

(30) Foreign Application Priority Data

Jul. 21, 2016    (KR) ........................ 10-2016-0092887

(51) Int. Cl.
*H01M 50/296*          (2021.01)
*B60L 50/64*            (2019.01)
(Continued)

(52) U.S. Cl.
CPC ........... *B60L 50/64* (2019.02); *H01M 50/204* (2021.01); *H01M 50/207* (2021.01); (Continued)

(58) Field of Classification Search
CPC ........................... H01M 50/296; H01R 11/281
See application file for complete search history.

(56) References Cited

U.S. PATENT DOCUMENTS

| | | |
|---|---|---|
| 8,956,186 B2 | 2/2015 | de Chazal |
| 9,564,619 B2 | 2/2017 | Motokawa et al. |
| | (Continued) | |

FOREIGN PATENT DOCUMENTS

| | | |
|---|---|---|
| CN | 1808774 A | 7/2006 |
| EP | 2020708 A1 | 2/2009 |
| | (Continued) | |

OTHER PUBLICATIONS

International Search Report for corresponding International Application No. PCT/KR2017/007642, dated Nov. 28, 2017, 5pp.

(Continued)

*Primary Examiner* — Barbara L Gilliam
*Assistant Examiner* — Jordan E Berresford
(74) *Attorney, Agent, or Firm* — Womble Bond Dickinson (US) LLP

(57) ABSTRACT

A battery module is provided. The battery module includes: a housing accommodating a plurality of battery packs electrically connected to each other; and a high-voltage connector formed on the housing, wherein the high-voltage connector includes: a terminal block including an electrode through which current flows and a shielding portion formed to surround the electrode; a connection block electrically connected to the shielding portion; and a bracket interposed between the terminal block and the connection block, wherein the bracket includes a first ground hole forming an electrical connection with the connection block and a second ground hole forming an electrical connection with the housing, and a helical pattern is formed in the first and second ground holes. Accordingly, electromagnetic noise may be effectively shielded and removed.

20 Claims, 11 Drawing Sheets

(51) Int. Cl.

| | |
|---|---|
| *H01M 50/204* | (2021.01) |
| *H01M 50/207* | (2021.01) |
| *H01M 50/262* | (2021.01) |
| *H01M 50/264* | (2021.01) |
| *H01M 50/588* | (2021.01) |

(52) U.S. Cl.
CPC ....... *H01M 50/262* (2021.01); *H01M 50/264* (2021.01); *H01M 50/296* (2021.01); *H01M 50/588* (2021.01)

(56) References Cited

U.S. PATENT DOCUMENTS

| | | | |
|---|---|---|---|
| 9,660,246 | B2 | 5/2017 | Ishikawa et al. |
| 2009/0034165 | A1 | 2/2009 | Tyler et al. |
| 2013/0040190 | A1 | 2/2013 | Yoon |
| 2014/0183310 | A1 | 7/2014 | Shimizu |
| 2015/0024629 | A1 | 1/2015 | Snader et al. |
| 2016/0093868 | A1 | 3/2016 | Ishikawa et al. |
| 2017/0062879 | A1 | 3/2017 | Roh et al. |

FOREIGN PATENT DOCUMENTS

| | | | |
|---|---|---|---|
| JP | 2006-40547 | A | 2/2006 |
| JP | 2011-103259 | A | 5/2011 |
| JP | 2016-71937 | A | 5/2016 |
| KR | 10-2012-0095161 | A | 8/2012 |
| KR | 10-2012-0101022 | A | 9/2012 |
| KR | 10-2012-0136864 | A | 12/2012 |
| KR | 10-2013-0016868 | A | 2/2013 |
| KR | 10-2014-0000731 | A | 1/2014 |
| KR | 10-2015-0128604 | A | 11/2015 |
| KR | 10-2015-0128851 | A | 11/2015 |

OTHER PUBLICATIONS

Written Opinion for corresponding International Application No. PCT/KR2017/007642, dated Nov. 28, 2017, 4pp.
Chinese Office action from corresponding Chinese Patent Application No. 201780045155.9, Chinese Office Action mailed Aug. 24, 2021, with English translation (6pgs.).
Chinese Office action, with English translation, dated Jan. 4, 2021, issued in corresponding Chinese Patent Application No. 201780045155. 9, 14 pages.
Korean Notice of Allowance dated Feb. 12, 2020, for corresponding Korean Patent Application No. 10-2016-0092887, 2 pages.
EPO Extended Search Report dated Mar. 5, 2020, for corresponding European Patent Application No. 17831290.6, 6 pages.

BATTERY MODULE COMPRISING TERMINAL BLOCK WITH SHIELDING PORTION

CROSS-REFERENCE TO RELATED APPLICATIONS

This application is a continuation of U.S. patent application Ser. No. 16/319,114, filed on Jan. 18, 2019, which is a National Phase Patent Application of International Patent Application Number PCT/KR2017/007642, filed on Jul. 17, 2017, which claims priority of Korean Patent Application No. 10-2016-0092887, filed on Jul. 21, 2016, the entire contents of all of which are incorporated herein by reference.

TECHNICAL FIELD

The present disclosure relates to battery modules.

BACKGROUND ART

In general, secondary batteries are rechargeable, unlike primary batteries. Secondary batteries may be used as energy sources for mobile devices, electric vehicles, hybrid vehicles, electric bicycles, uninterruptible power supplies, or the like. Depending on the types of external devices to which they are applied, the secondary batteries may be used in the form of a single battery or in the form of a battery module in which a plurality of batteries are electrically connected and combined into one unit.

A small mobile device such as a mobile phone may operate for a certain time according to the output and capacity of a single battery. However, in the case of long-time driving or high-power driving such as in the case of an electric vehicle or a hybrid vehicle with high power consumption, a battery module may be preferred due to output and capacity issues. In such a battery module, the output voltage or the output current may be increased according to the number of built-in batteries.

Since vehicle batteries for supplying driving power to vehicles have recently been actively developed but a plurality of electronic components are currently installed in a vehicle for driving control, there is a need for technology for blocking electromagnetic interference that may cause driving errors in electronic components.

The background art of the present disclosure is disclosed in KR Patent Application Publication No. 2015-0128851.

DESCRIPTION OF EMBODIMENTS

Technical Problem

Provided is a battery module that may effectively shield and remove electromagnetic noise.

Solution to Problem

According to an aspect of the present disclosure, a battery module includes: a housing accommodating a plurality of battery packs electrically connected to each other; and a high-voltage connector formed on the housing, wherein the high-voltage connector includes: a terminal block including an electrode through which current flows and a shielding portion formed to surround the electrode; a connection block electrically connected to the shielding portion; and a bracket interposed between the terminal block and the connection block, wherein the bracket includes a first ground hole forming an electrical connection with the connection block and a second ground hole forming an electrical connection with the housing, and a helical pattern is formed in the first and second ground holes.

Advantageous Effects of Disclosure

According to the present disclosure, by effectively shielding and removing electromagnetic noise that may be caused by high-frequency vibrations of charge/discharge currents, malfunction of other electronic units due to the electromagnetic noise in the driving environment of a battery module may be prevented. Particularly, a plurality of electronic units are mounted in an electric vehicle using a battery module as a driving power supply, and when a plurality of electronic units for controlling the operation of the electric vehicle malfunction, it may immediately lead to an accident. According to the present disclosure, by providing a ground path for effectively shielding and removing electromagnetic noise and forming a stable and sufficient conductive contact between the components forming the ground path, a vehicle battery module with improved driving safety may be provided.

BEST MODE

Figure 1:
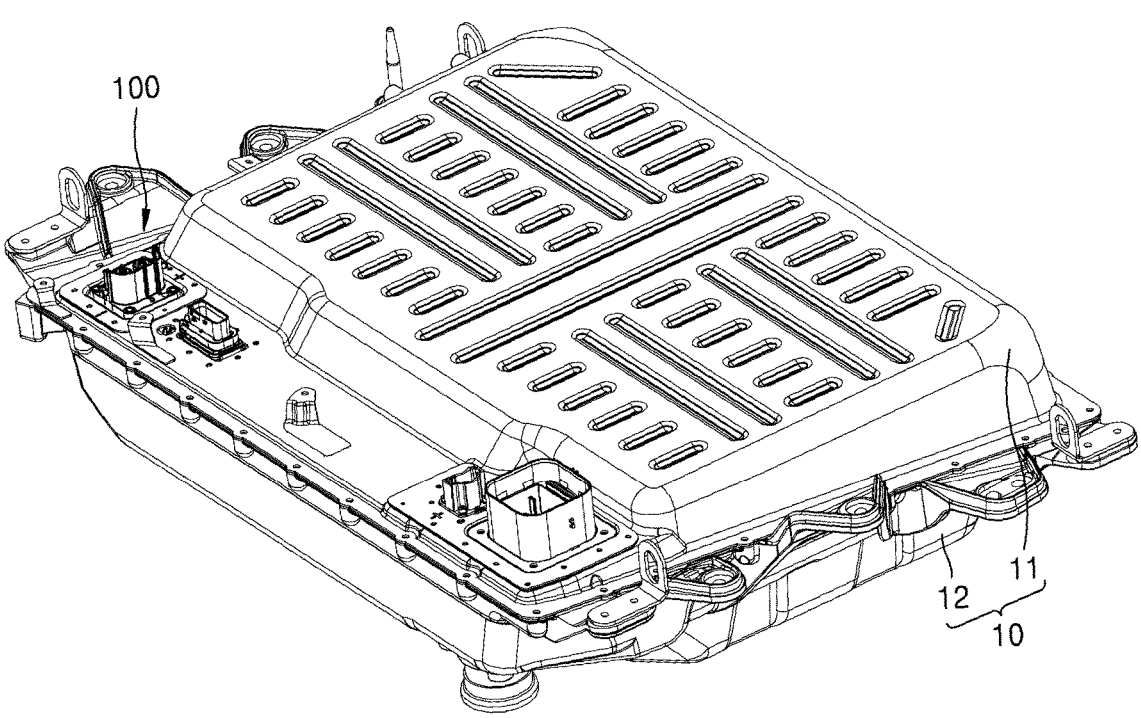
FIGS. 1 and 2 illustrate perspective views of a battery module according to an example embodiment of the present disclosure.

According to an embodiment of the present disclosure, a battery module includes: a housing accommodating a plurality of battery packs electrically connected to each other; and a high-voltage connector formed on the housing, wherein the high-voltage connector includes: a terminal block including an electrode through which a current flows and a shielding portion formed to surround the electrode; a connection block electrically connected to the shielding portion; and a bracket interposed between the terminal block and the connection block, wherein the bracket includes a first ground hole forming an electrical connection with the connection block and a second ground hole forming an electrical connection with the housing and a helical pattern is formed at the first and second ground holes.

For example, the bracket may further include a first coupling hole forming a mechanical coupling with the connection block and a second coupling hole forming a mechanical coupling with the housing, and a helical pattern may not be formed at the first and second coupling holes.

For example, the first ground hole and the first coupling hole may be formed in an inner region of the bracket, and the second ground hole and the second coupling hole may be formed in an outer region of the bracket.

For example, the inner region may mediate a coupling between the terminal block, the bracket, and the connection block, and the outer region may mediate a coupling between the bracket and the housing.

For example, first fastening members of substantially identical structures may be assembled to the first ground hole and the first coupling hole, and second fastening members of substantially identical structures may be assembled to the second ground hole and the second coupling hole.

For example, the first fastening members may be formed to have larger diameters than the second fastening members.

For example, the bracket may include: an opening allowing a coupling between the terminal block and the connection block on both sides of the bracket; and an inner region and an outer region extending in parallel to each other while surround the opening.

For example, the first and second ground holes may be formed at positions facing each other in the inner region and the outer region, respectively.

For example, a first coupling hole forming a mechanical coupling with the connection block may be further formed in the inner region.

For example, the first ground hole may be formed at one corner portion of the inner region, and the first coupling hole may be formed at the other three corner portions other than the one corner portion.

For example, a second coupling hole forming a mechanical coupling with the housing may be further formed in the outer region of the bracket.

For example, the second ground hole may be formed at one corner portion of the outer region facing the first ground hole, and a second coupling hole may be formed at each of four side portions of the outer region.

For example, an arrangement of all holes including the second ground hole and the second coupling hole may be asymmetrical with respect to a central line of the bracket.

For example, the first ground hole may be formed at one corner portion of the inner region, and the second ground hole may be formed at one side portion of the outer region.

For example, a second coupling hole may be formed at the other three side portions other than the one side portion of the outer region.

For example, an arrangement of all holes including the second ground hole and the second coupling hole may be asymmetrical with respect to a central line of the bracket.

For example, the terminal block may include an insulating portion insulating the electrode and the shielding portion from each other, and the shielding portion may be electrically connected to the connection block by contacting the connection block while extending along the insulating portion.

For example, the shielding portion may include a metal member of a hollow cylindrical shape surrounding the electrode.

For example, the connection block may be electrically connected to the bracket via a first fastening member penetrating the first ground hole, and the bracket may be electrically connected to the housing via a second fastening member penetrating the second ground hole.

For example, the first fastening member may form a screw fastening by engaging with the helical pattern formed at the first ground hole, and the second fastening member may form a screw fastening by engaging with the helical pattern formed at the second ground hole.

MODE OF DISCLOSURE

Hereinafter, battery modules according to example embodiments of the present disclosure will be described with reference to the accompanying drawings.

Figure 2:
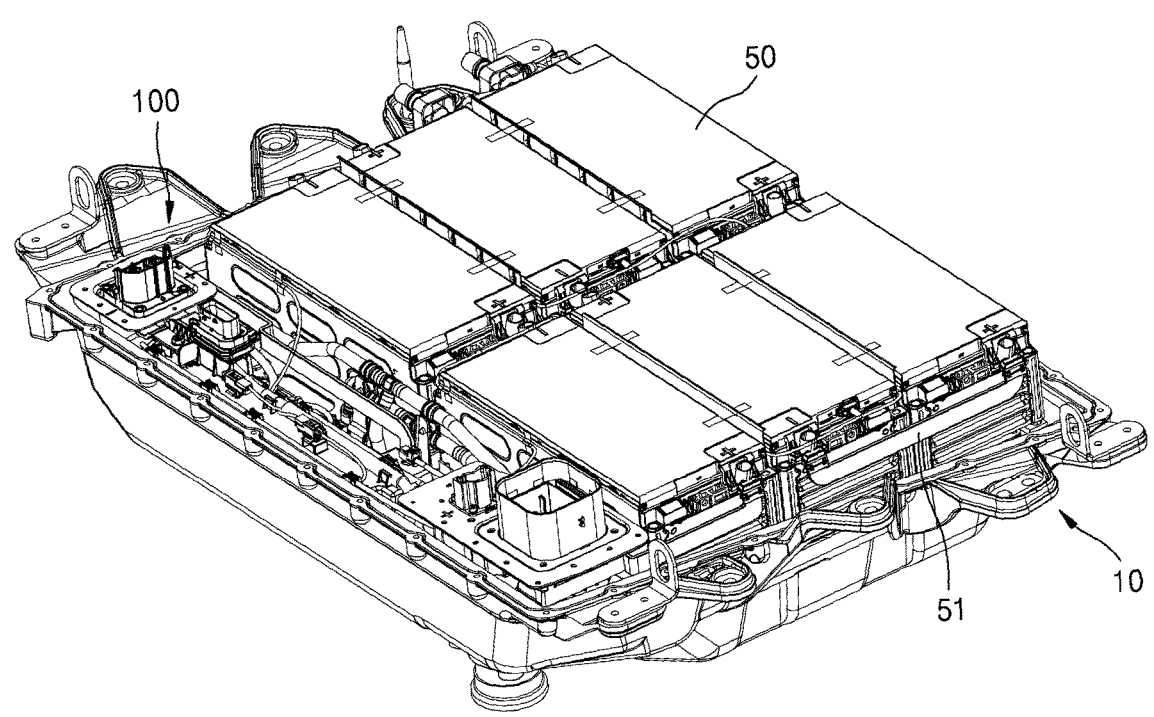

FIGS. 1 and 2 illustrate a battery module according to an example embodiment of the present disclosure.

Referring to the drawings, the battery module may include a plurality of battery packs 50 and a housing 10 for accommodating the plurality of battery packs 50. For example, the housing 10 may include first and second housings 11 and 12 coupled to each other in opposite directions with the plurality of battery packs 50 therebetween. For example, the plurality of battery packs 50 may be electrically connected to each other by using a bus bar 51, and a plurality of battery packs 50 may be electrically connected to each other in a serial manner, in a parallel manner, or in a serial-parallel hybrid manner to provide a desired electrical output.

The battery module may include a high-voltage connector 100 exposed outside the housing 10. For example, the high-voltage connector 100 may be formed on the first housing 11 forming an upper portion of the housing 10. The battery module may provide driving power of a vehicle, and the high-voltage connector 100 may form an output terminal for supplying the driving power.

Figure 3:
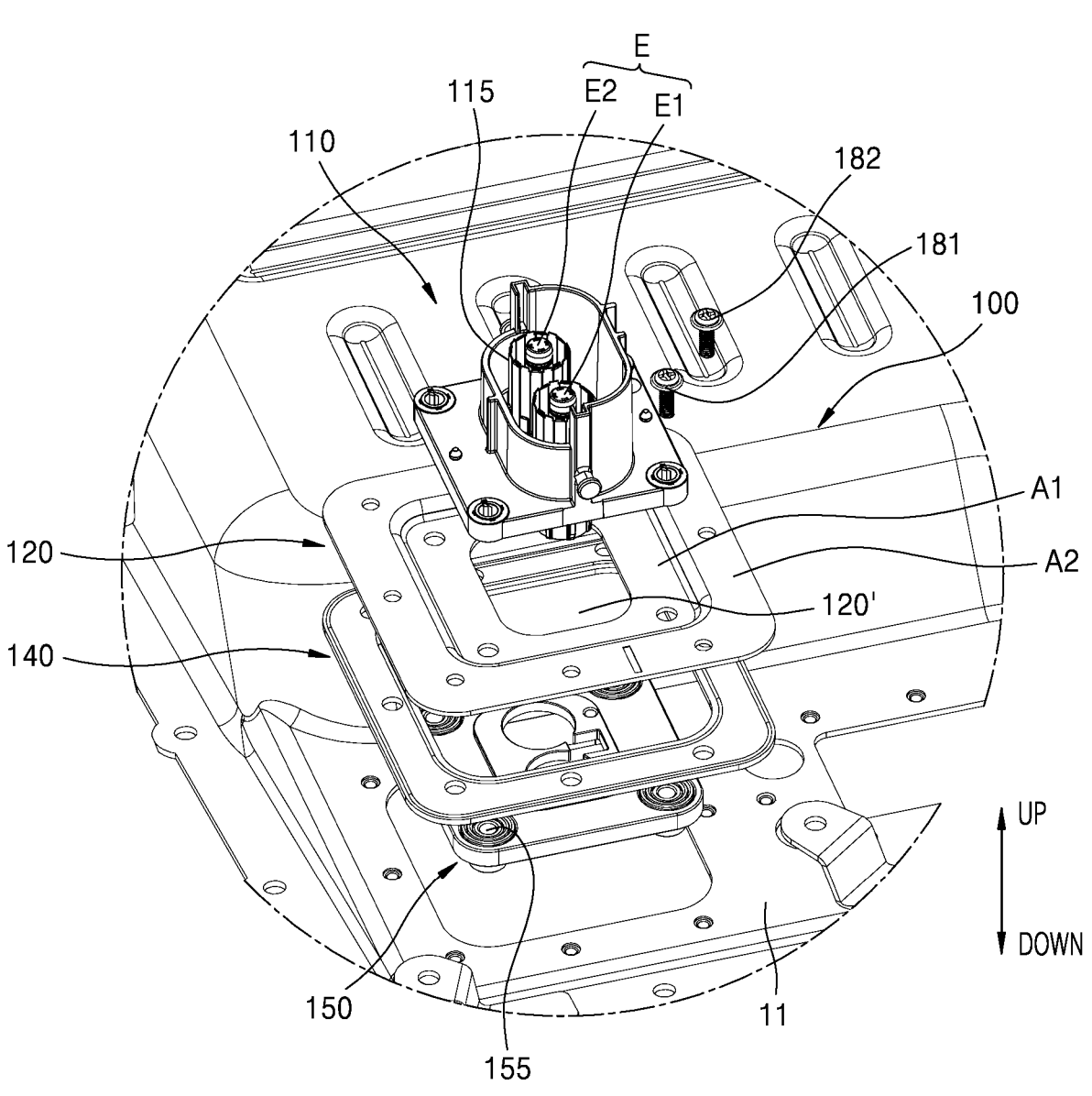
FIG. 3 illustrates an exploded perspective view of a high-voltage connector illustrated in FIG. 1.
Figure 4:
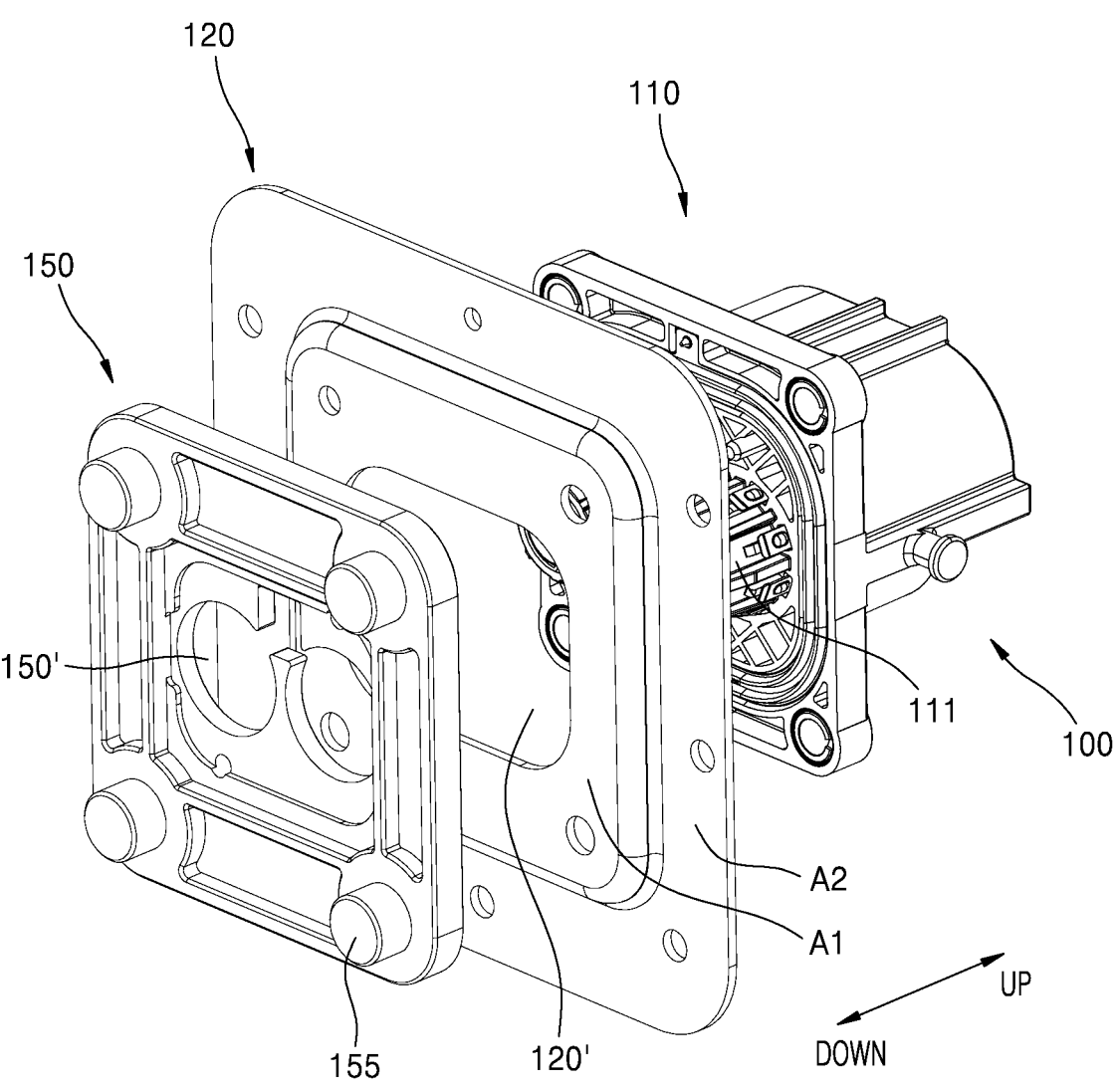
FIGS. 4 and 5 illustrate perspective views of the high-voltage connector illustrated in FIG. 3.
Figure 5:
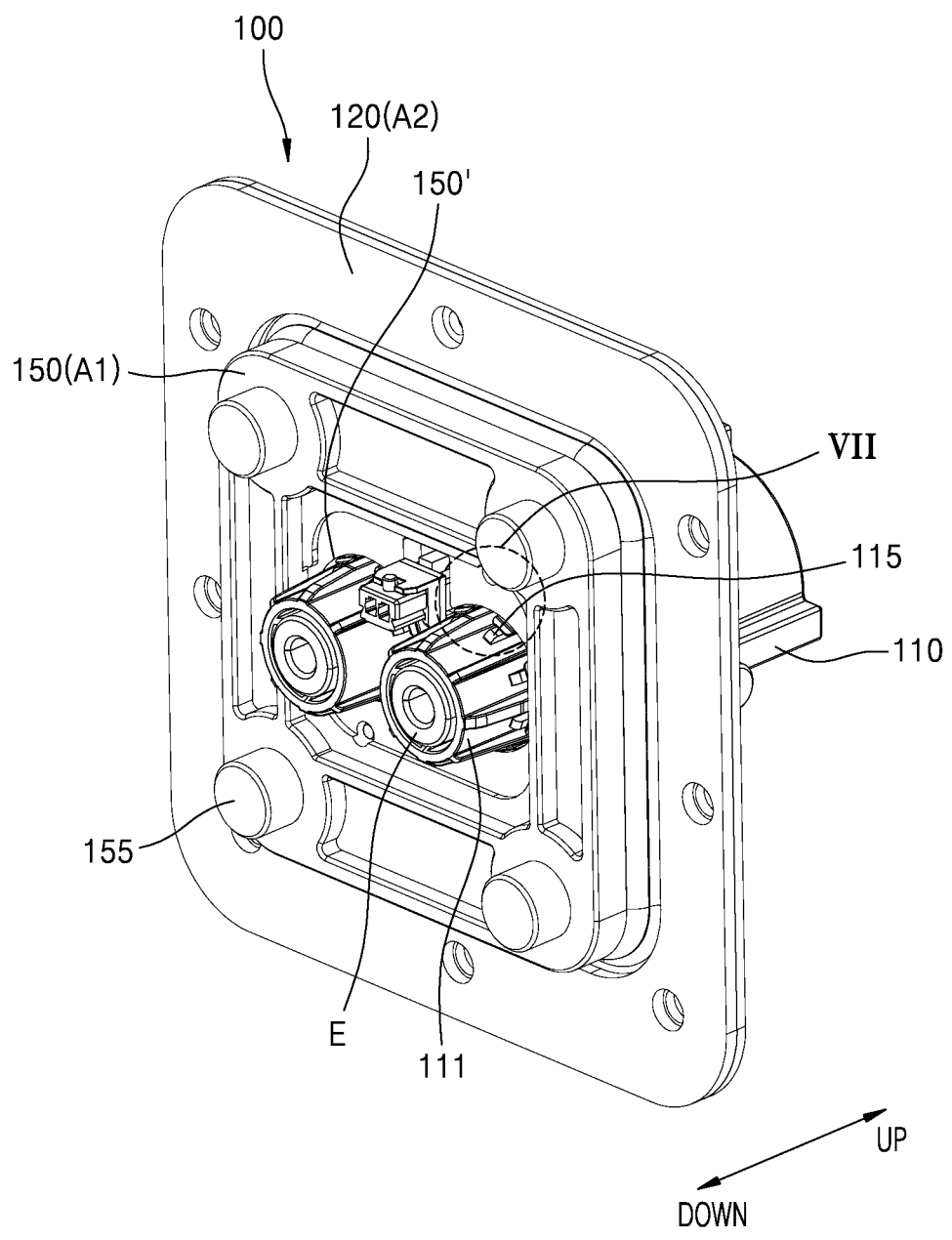
Figure 6A:
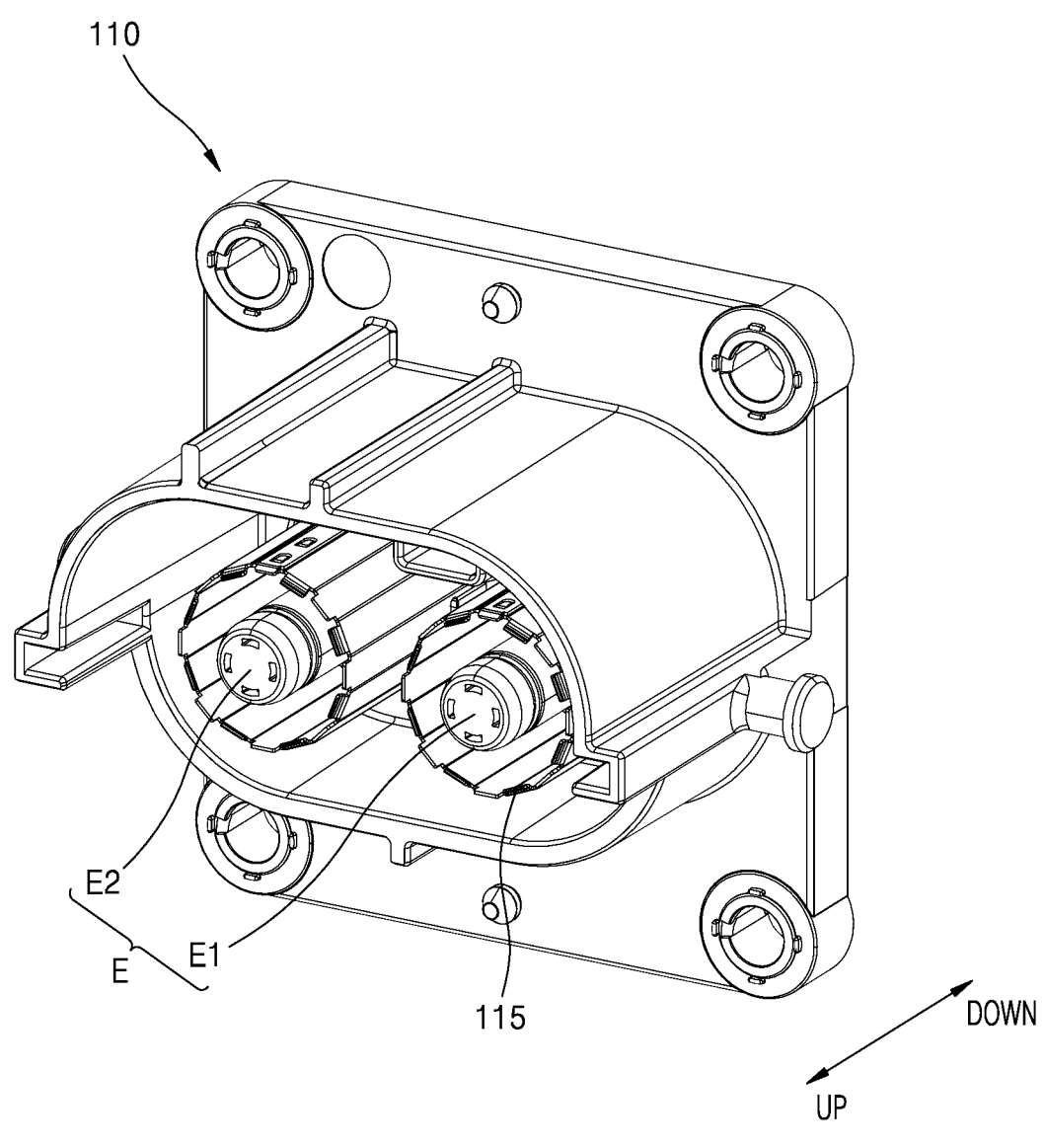
FIGS. 6A and 6B respectively illustrate front and rear perspective views of a terminal block illustrated in FIG. 5.
Figure 6B:
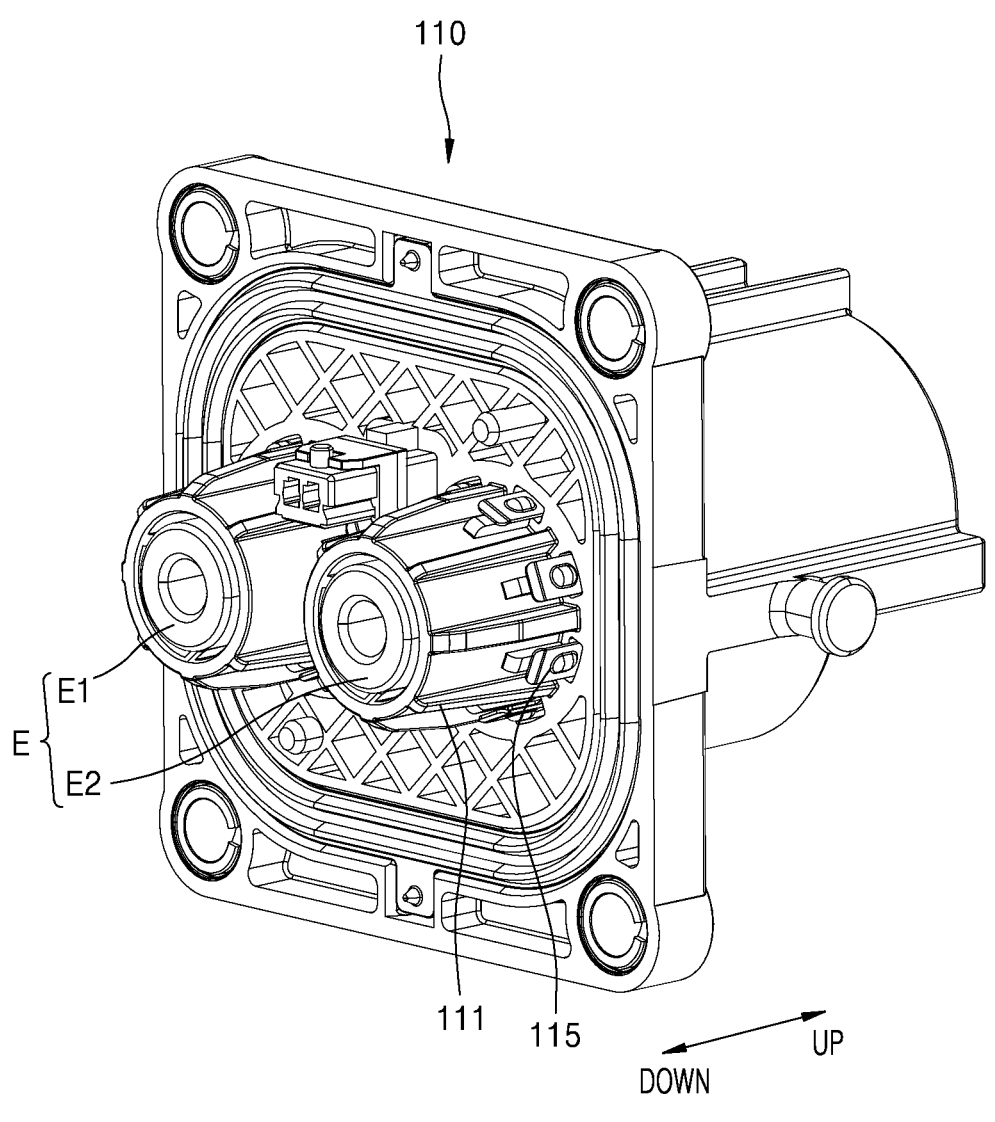
Figure 7:
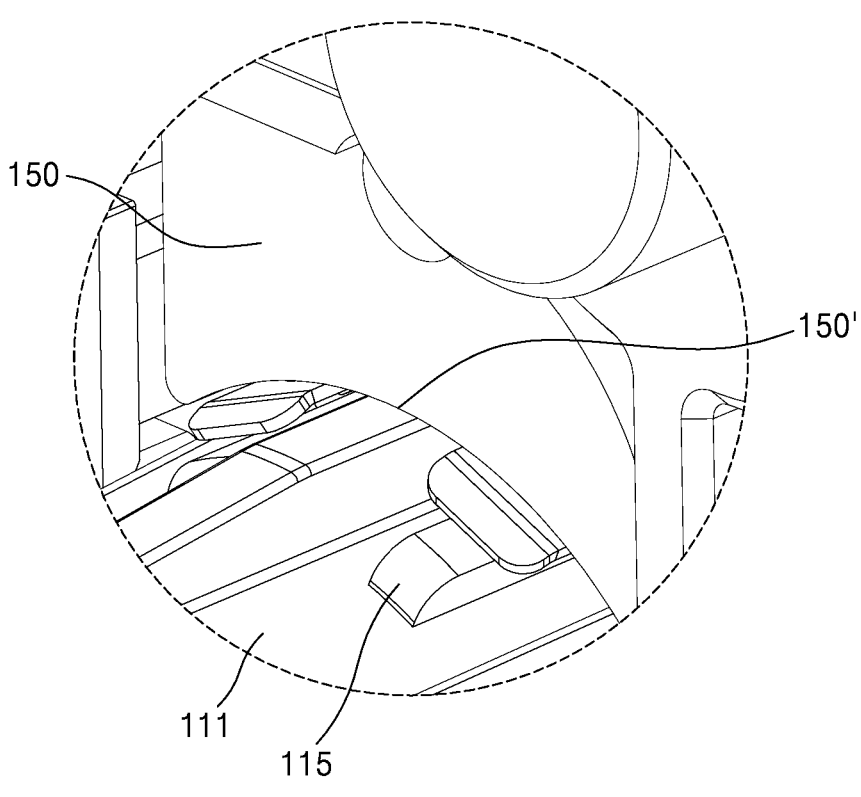
FIG. 7 illustrates an enlarged perspective view of portion VII of FIG. 5.
Figure 8:
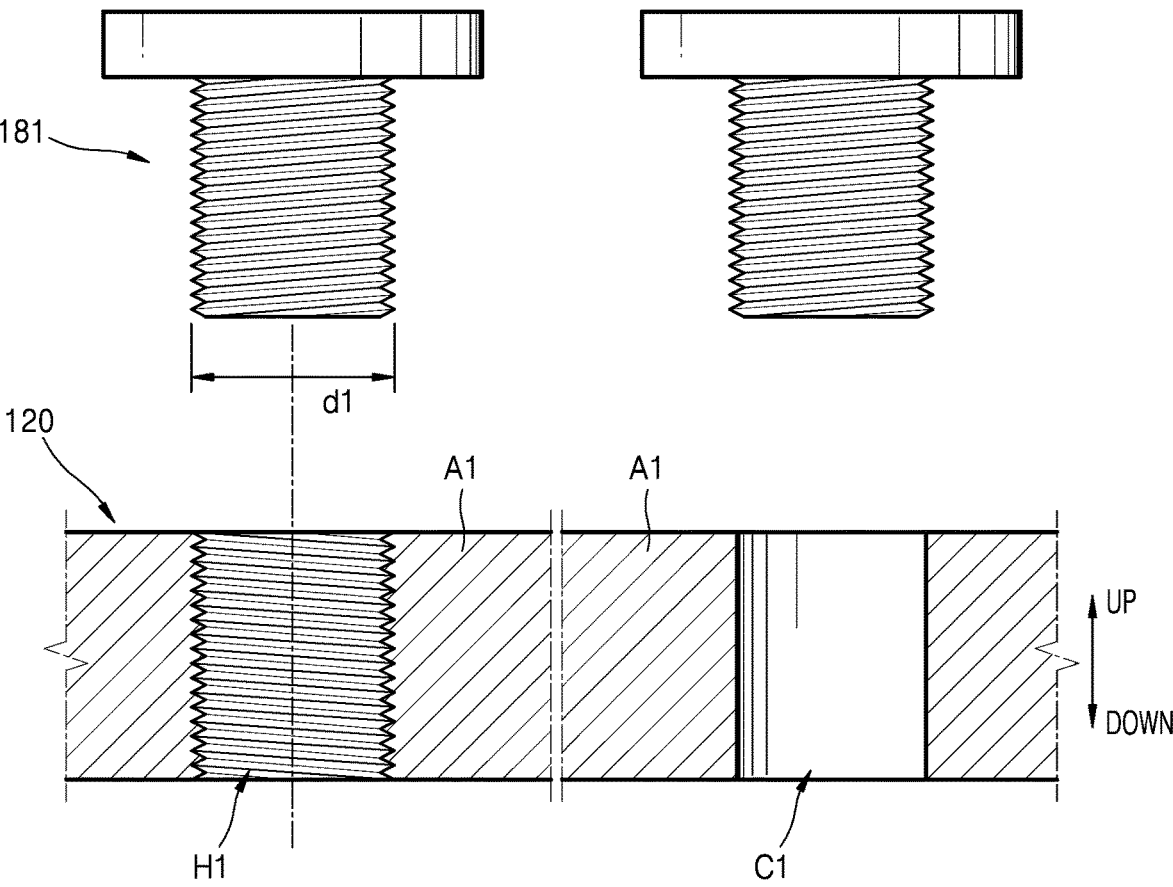
FIG. 8 illustrates a diagram illustrating an electrical connection between a first ground hole and a first fastening member.
Figure 9:
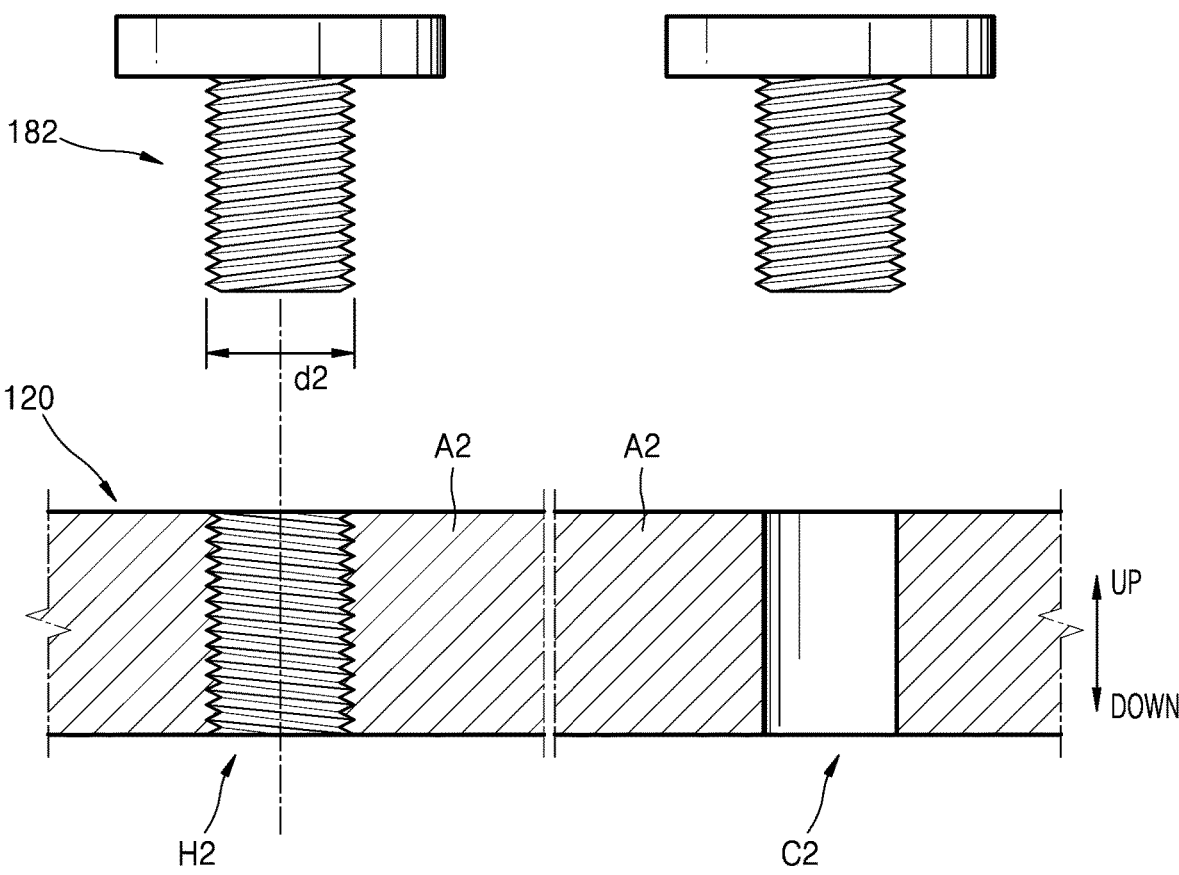
FIG. 9 illustrates a diagram illustrating an electrical connection between a second ground hole and a second fastening member.

FIG. 3 illustrates an exploded perspective view of a high-voltage connector illustrated in FIG. 1. FIGS. 4 and 5 illustrate perspective views of the high-voltage connector illustrated in FIG. 3. FIGS. 6A and 6B respectively illustrate front and rear perspective views of a terminal block illustrated in FIG. 5. FIG. 7 illustrates an enlarged perspective view of a portion VII of FIG. 5. FIG. 8 illustrates a diagram illustrating an electrical connection between a first ground hole and a first fastening member, and FIG. 9 illustrates a diagram illustrating an electrical connection between a second ground hole and a second fastening member.

The high-voltage connector 100 may correspond to an output terminal for supplying driving power of the vehicle, and a charge/discharge current output from the high-voltage connector 100 may be input to a driving motor (not illustrated) through a power converter (not illustrated) such as an inverter.

The high-voltage connector 100 may include: a terminal block 110 including an electrode E through which a charge/discharge current is input/output; a bracket 120 for mediating a coupling between the terminal block 110 and the first housing 11, and a sealing member 140 for sealing between the bracket 120 and the first housing 11. The bracket 120 may form and mediate a coupling between the terminal block 110 thereover and the lower first housing 11 thereunder.

The bracket 120 may include an inner region A1 on which the terminal block 110 is seated and an outer region A2 surrounding the inner region A1. A first fastening member 181 may penetrate the inner region A1 of the bracket 120 to couple the terminal block 110 and a connection block 150 formed on both sides of the bracket 120. In other words, the inner region A1 of the bracket 120 may mediate a coupling between the terminal block 110, the bracket 120, and the connection block 150. Thus, the inner region A1 of the bracket 120 may mean a portion of the bracket 120 overlapping with the terminal block 110 and the connection block 150. A second fastening member 182 may penetrate the outer region A2 of the bracket 120 to mediate a coupling between the bracket 120 and the first housing 11. Thus, the outer region A2 of the bracket 120 may mean a portion of the bracket 120 overlapping with the first housing 11.

The inner region A1 and the outer region A2 of the bracket 120 may extend in parallel to each other while surrounding an opening 120' at the center of the bracket 120. The inner region A1 and the outer region A2 of the bracket 120 may be formed in the shape of a substantially hollow and rectangular frame and may extend in parallel to each other. Meanwhile, an opening 120' may be formed at the center of the bracket 120, and the terminal block 110 and the connection block 150 arranged on both sides of the bracket 120 may be coupled to each other through the opening 120'.

The terminal block 110 may include first and second electrodes E1 and E2 having different polarities and may include a shielding portion 115 surrounding the first and second electrodes E1 and E2. For example, the shielding portion 115 may be formed in a hollow cylindrical shape to surround the first and second electrodes E1 and E2 and may be formed of a conductive metal material to block electromagnetic noise. As described below, the shielding portion 115 may be grounded to a frame of the vehicle, may flow electromagnetic wave noise caused by high-voltage waves to the ground, and may prevent the malfunction of electronic units caused by the electromagnetic noise. A pair of shielding portions 115 may be formed to surround the first and second electrodes E1 and E2, respectively. The pair of shielding portions 115 may shield the electromagnetic noise from the first and second electrodes E1 and E2.

As illustrated in FIG. 6B, the terminal block 110 may further include an insulating portion 111 for insulation between the shielding portion 115 and the first and second electrodes E1 and E2. The insulating portion 111 may be formed in the shape of a hollow cylinder extending together with the first and second electrodes E1 and E2 while surrounding the first and second electrodes E1 and E2. For example, a pair of insulating portions 111 may be formed to provide the insulation between the shielding portion 115 and the first and second electrodes E1 and E2, respectively.

The insulating portion 111 may extend from the terminal block 110 toward the connection block 150 thereunder, and the first and second electrodes E1 and E2 and the shielding portion 115 may extend in parallel along the inside and the outside of the insulating portion 111. More particularly, the first and second electrodes E1 and E2 may extend downward inside the insulating portion 111, and the shielding portion 115 may extend downward outside the insulating portion 111. The insulating portion 111 may support the first and second electrodes E1 and E2 and/or the shielding portion 115 while extending in parallel with the first and second electrodes E1 and E2 and the shielding portion 115.

Referring to FIGS. 4, 5, and 7, the insulating portion 111 may be inserted into a through hole 150' of the connection block 150. Since the insulating portion 111 is inserted into the through hole 150' of the connection block 150, the shielding portion 115 and the connection block 150 outside the insulating portion 111 may be electrically connected to each other by contacting each other. For example, the shielding portion 115 may form a close contact and a conductive contact with the periphery of the through hole 150'. As described below, the connection block 150 may form a conductive contact with the shielding portion 115 and may receive the electromagnetic noise captured by the shielding portion 115.

The connection block 150 may include a pair of through holes 150' penetrated by the insulating portion 111. In this case, the insulating portion 111 may be inserted into the through hole 150' of the connection block 150, and the periphery of the through hole 150' and the shielding portion 115 outside the insulating portion 111 may contact each other to form a conductive contact between the shielding portion 115 and the connection block 150. That is, the shielding portion 115 may extend toward the connection block 150 along the outside of the insulating portion 111 and may form a conductive contact with the periphery of the through hole 150' while penetrating the through hole 150' of the connection block 150, and the electromagnetic noise captured by the shielding portion 115 may flow to the connection block 150.

Referring to FIGS. 3, 4, and 8 together, the connection block 150 may be electrically connected to the bracket 120 through the first fastening member 181 fastened to the inner region A1 of the bracket 120. The first fastening member 181 penetrating the inner region A1 of the bracket 120 may be fastened to a coupling portion 155 of the connection block 150. A first ground hole H1 and a first coupling hole C1 may be formed in the inner region A1 of the bracket 120, and the first fastening member 181 fastened to the first ground hole H1 may be coupled to the connection block 150 through the inner region A1 of the bracket 120 to electrically connect the bracket 120 and the connection block 150.

A helical pattern may be formed at the inner wall of the first ground hole H1. Since a helical pattern is formed at the inner wall of the first ground hole H1, an electrical connection with the first fastening member 181 penetrating the first ground hole H1 may be securely formed. That is, since a helical pattern is formed at the inner wall of the first ground hole H1, the first fastening member 181 and the first ground hole H1 may be screw-fastened to form a sufficient conductive contact therebetween. Herein, "screw-fastening" may mean that the helical pattern of the first ground hole H1 and the helical pattern of the first fastening member 181 may be matched and engaged with each other to closely contact each other to form a sufficient contact area therebetween.

If the inner wall of the first ground hole H1 is formed as a flat surface, the first fastening member 181 may not form a sufficient contact with the inner wall of the first ground hole H1 or a contact state therebetween may be incomplete due to the tolerance of the first ground hole H1. However, since a helical pattern is formed at the inner wall of the first ground hole H1, the helical-pattern protrusions thereof and the helical grooves of the first fastening member 181 may be engaged with each other to form a sufficient contact area therebetween and to secure a close contact therebetween.

The first fastening member 181 may form an electrical connection with the connection block 150. For example, the first fastening member 181 may be fastened to the connection block 150 while engaging with the helical pattern of the first ground hole H1. As described below, the electromagnetic noise captured by the shielding portion 115 may be received in the bracket 120 through the connection block 150 and the first fastening member 181 and may be discharged to the first housing 11 through the second fastening member 182 fastened to the outer region A2 of the bracket 120.

Unlike the first ground hole H1, the first coupling hole C1 may be formed to be simply penetrated by the first fastening member 181, and the inner wall of the first coupling hole C1 may be formed as a flat surface. In this case, the first coupling hole C1 may form a mechanical coupling between the bracket 120 and the connection block 150, and the inner wall of the first coupling hole C1 may be formed as a flat surface without a helical pattern in consideration for convenience in process. However, the first fastening member 181 fastened to the first coupling hole C1 and the first fastening member 181 fastened to the first ground hole H1 may be formed in the same structure. Each of the first fastening members 181 may be fastened to the coupling portion 155 of the connection block 150 through the first coupling hole C1 or the first ground hole H1. In this case, for screw-fastening with the connection block 150, a helical pattern may be formed at all the first fastening members 181.

Referring to FIGS. 3 and 9, a second ground hole H2 and a second coupling hole C2 may be formed in the outer region A2 of the bracket 120. A helical pattern may be formed at the inner wall of the second ground hole H2. Since a helical pattern is formed at the inner wall of the second ground hole H2, an electrical connection with the second fastening member 182 penetrating the second ground hole H2 may be securely formed. That is, since a helical pattern is formed at the inner wall of the second ground hole H2, the second fastening member 182 and the second ground hole H2 may be screw-fastened to form a sufficient conductive contact therebetween. Herein, "screw-fastening" may mean that the helical pattern of the second ground hole H2 and the helical pattern of the second fastening member 182 may be matched and engaged with each other to closely contact each other to form a sufficient contact area therebetween.

If the inner wall of the second ground hole H2 is formed as a flat surface, the second fastening member 182 may not form a sufficient contact with the inner wall of the second ground hole H2 or a contact state therebetween may be incomplete due to the tolerance of the second ground hole H2. However, since a helical pattern is formed at the inner wall of the second ground hole H2, the helical-pattern protrusions thereof and the helical grooves of the second fastening member 182 may be engaged with each other to form a sufficient contact area therebetween and to secure a close contact therebetween.

Referring to FIG. 3, the second fastening member 182 may form an electrical connection with the first housing 11. For example, the second fastening member 182 may be fastened to the first housing 11 while engaging with the helical pattern of the second ground hole H2. As described above, the electromagnetic noise captured by the shielding portion 115 may be received in the bracket 120 through the connection block 150 and the first fastening member 181 and may be discharged to the first housing 11 through the second fastening member 182. The first housing 11 may be formed of a conductive metal material and may be electrically connected to the frame of the vehicle forming the ground. The electromagnetic noise captured by the shielding portion 115 may flow to the frame of the vehicle via the first housing 11.

Referring to FIG. 9, unlike the second ground hole H2, the second coupling hole C2 may be formed to be simply penetrated by the second fastening member 182, and the inner wall of the second coupling hole C2 may be formed as a flat surface. In this case, the second coupling hole C2 may provide a mechanical coupling between the bracket 120 and the first housing 11, and the inner wall of the second coupling hole C2 may be formed as a flat surface without a helical pattern in consideration for convenience in process. However, the second fastening member 182 fastened to the second coupling hole C2 and the second fastening member 182 fastened to the second ground hole H2 may be formed in the same structure. Each of the second fastening members 182 may be fastened to the first housing 11 through the second coupling hole C2 or the second ground hole H2. In this case, for screw-fastening with the first housing 11, a helical pattern may be formed at all the second fastening members 182.

The first and second fastening members 181 and 182 may be formed to have different diameters d1 and d2. For example, the first fastening member 181 may be connected to the connection block 150 having a relatively small area and may be formed to have a relatively large diameter d1. On the contrary, the second fastening member 182 may be connected to the bracket 120 having a relatively large area and may be formed to have a relatively small diameter d2. The first and second fastening members 181 and 182 may provide a ground path for the electromagnetic noise. In this case, the first fastening member 181 fastened to the connection block 150 having a relatively small capacitance may be formed to have a relatively large diameter d1, and the second fastening member 182 fastened to the bracket 120 having a relatively large capacitance may be formed to have a relatively small diameter d2.

Since the first and second fastening members 181 and 182 are formed to have different diameters d1 and d2, the first coupling hole C1 (or the first ground hole H1) and the second coupling hole C2 (or the second ground hole H2) to which the first and second fastening members 181 and 182 are respectively fastened may also be formed to have different diameters. That is, the first coupling hole C1 (or the first ground hole H1) may be formed to have a relatively large diameter, and the second coupling hole C2 (or the second ground hole H2) may be formed to have a relatively small diameter.

Figure 10:
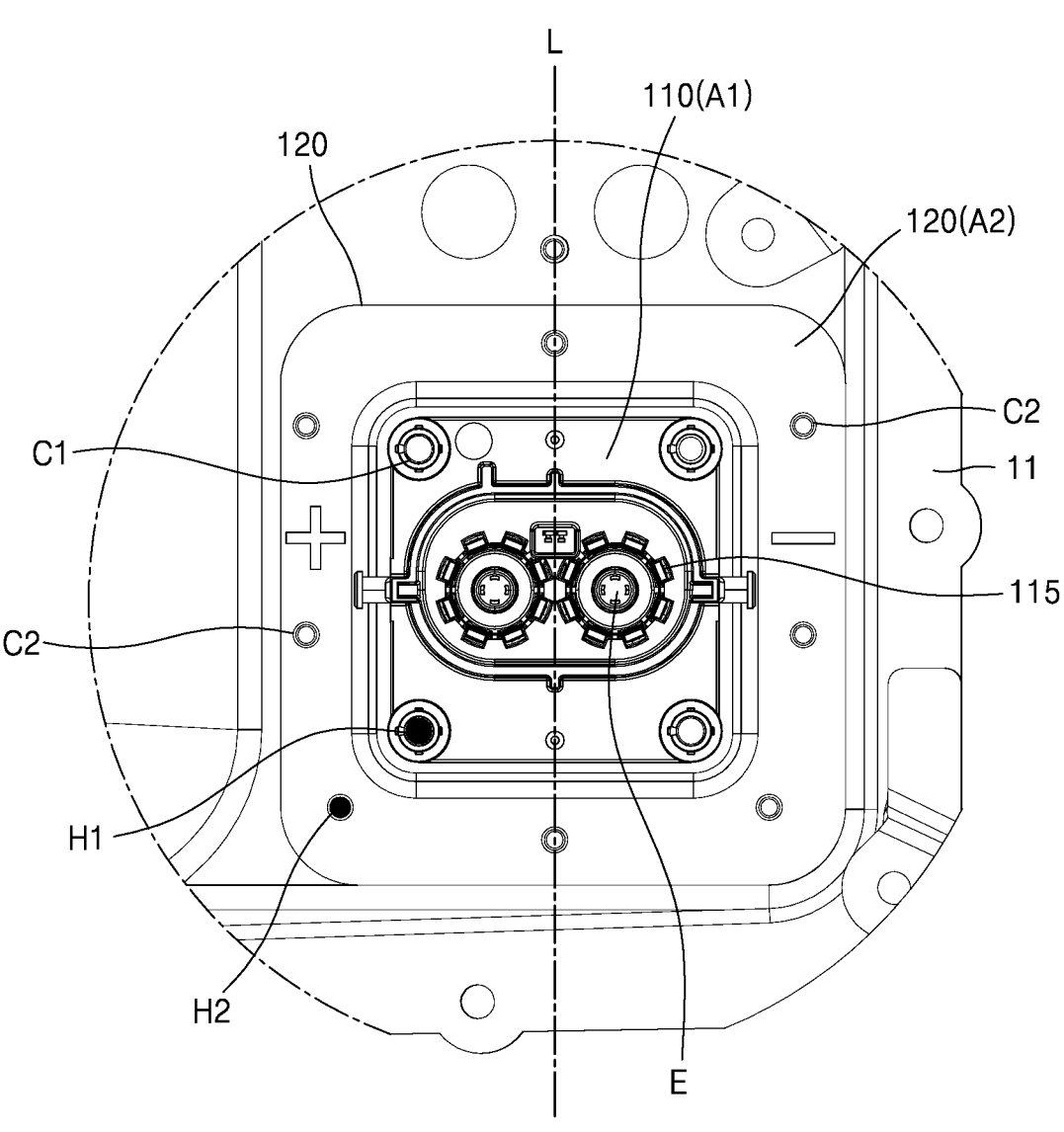
FIG. 10 illustrates a diagram illustrating the arrangement of ground holes and coupling holes formed in an inner region and an outer region of a bracket.

FIG. 10 illustrates a diagram illustrating the arrangement of ground holes and coupling holes formed in an inner region and an outer region of a bracket.

Referring to the drawings, a first ground hole H1 may be formed in the inner region A1 of the bracket 120, and a second ground hole H2 may be formed in the outer region A2 of the bracket 120. In this case, the first ground hole H1 of the inner region and the second ground hole H2 of the outer region may be formed at adjacent positions adjacent to each other. The first ground hole H1 of the inner region may form an electrical connection with the connection block 150, and the second ground hole H2 of the outer region may form an electrical connection with the first housing 11. Thus, the ground path of the electromagnetic noise may be shortened by forming the first ground hole H1 of the inner region and the second ground hole H2 of the outer region at adjacent positions. More particularly, the ground path of the electromagnetic noise may include the first fastening member 181 fastened to the first ground hole H1 of the inner region and the second fastening member 182 fastened to the second ground hole H2 of the outer region.

The ground path may be shortened by shortening the distance between the first and second fastening members 181 and 182, and the distance between the first and second fastening members 181 and 182 may vary according to the distance between the first ground hole H1 of the inner region and the second ground hole H2 of the outer region. The first ground hole H1 of the inner region and the second ground hole H2 of the outer region may be formed at opposite positions facing each other. As illustrated in the drawings, the first ground hole H1 of the inner region and the second ground hole H2 of the outer region may be formed at directly opposite positions in the diagonal direction of the bracket 120.

Herein, the first and second ground holes H1 and H2 directly facing each other (directly opposite to each other) may mean that the first and second ground holes H1 and H2 face each other without any other member therebetween. In other words, the first and second fastening members 181 and 182 fastened respectively to the first and second ground holes H1 and H2 may directly face each other without any other component therebetween.

Referring to FIGS. 3 and 10 together, both the first ground hole H1 and the first coupling hole C1 may form a mechanical connection with the connection block 150, more particularly the coupling portion 155 of the connection block 150. In other words, the first ground hole H1 may further form an electrical connection while forming a mechanical connection with the connection block 150. The connection block 150 may be formed in a substantially rectangular shape, and for a balanced coupling with the connection block 150, the first ground hole H1 and the first coupling hole C1 may be formed at four corner portions of the inner region A1, respectively. For example, the first ground hole H1 and the first coupling hole C1 may be formed at different corner portions of the inner region A1.

Both the second ground hole H2 and the second coupling hole C2 may form a mechanical connection between the bracket 120 and the first housing 11. In this case, for a balanced coupling between the bracket 120 and the first housing 11, the second ground hole H2 and the second coupling hole C2 may be distributedly formed at different points of the outer region A2.

At least one second coupling hole C2 may be formed at each side portion of the outer region A2 such that the second coupling holes C2 may not be concentrated on only any one side portion of the substantially rectangular outer region A2 or there may be no absence of fastening at any one side portion thereof. For example, the second ground hole H2 may be formed at a corner portion of the outer region A2 to face the first ground hole H1, and the second coupling holes C2 may be distributedly formed at four side portions of the outer region A2.

In a fastening operation, the bracket 120 and the first housing 11 may be sequentially fastened along the respective sides of the bracket 120, and the number of second coupling holes C2 may differ according to the fastening order. For example, for the stability of the fastening operation, a relatively large number of fastenings may be performed in a precedent fastening operation, and since fastening is performed in a subsequent fastening operation in a stable state where preliminary coupling is already performed, a relatively small number of second coupling holes C2 may be formed at a side portion on which subsequent fastening is performed. In this case, the arrangement of all the holes including the second ground hole H2 and the second coupling hole C2 may be asymmetrical with respect to a central line L of the bracket 120.

The total number and arrangement of second coupling holes C2 and second ground holes H2 may be determined in consideration for the balance of mechanical fastening. The number or arrangement of second ground holes H2 forming the electrical connection together with the mechanical coupling may be determined in consideration of the electrical connection. For example, since the second ground hole H2 may form a low-current path of the electromagnetic noise, only one second ground hole H2 may be formed, and as for the arrangement thereof, it may be formed at a position adjacent to the first ground hole H1 in order to shorten the path of the electromagnetic noise.

For example, the second ground hole H2 may be formed at a corner portion of the outer region A2 to face the first ground hole H1, and the second coupling holes C2 may be formed at each side portion of the outer region A2 without vacancy for a balanced fastening, wherein the number of second coupling holes C2 formed at each side portion of the outer region A2 may differ according to the order of the fastening operation.

Figure 11:
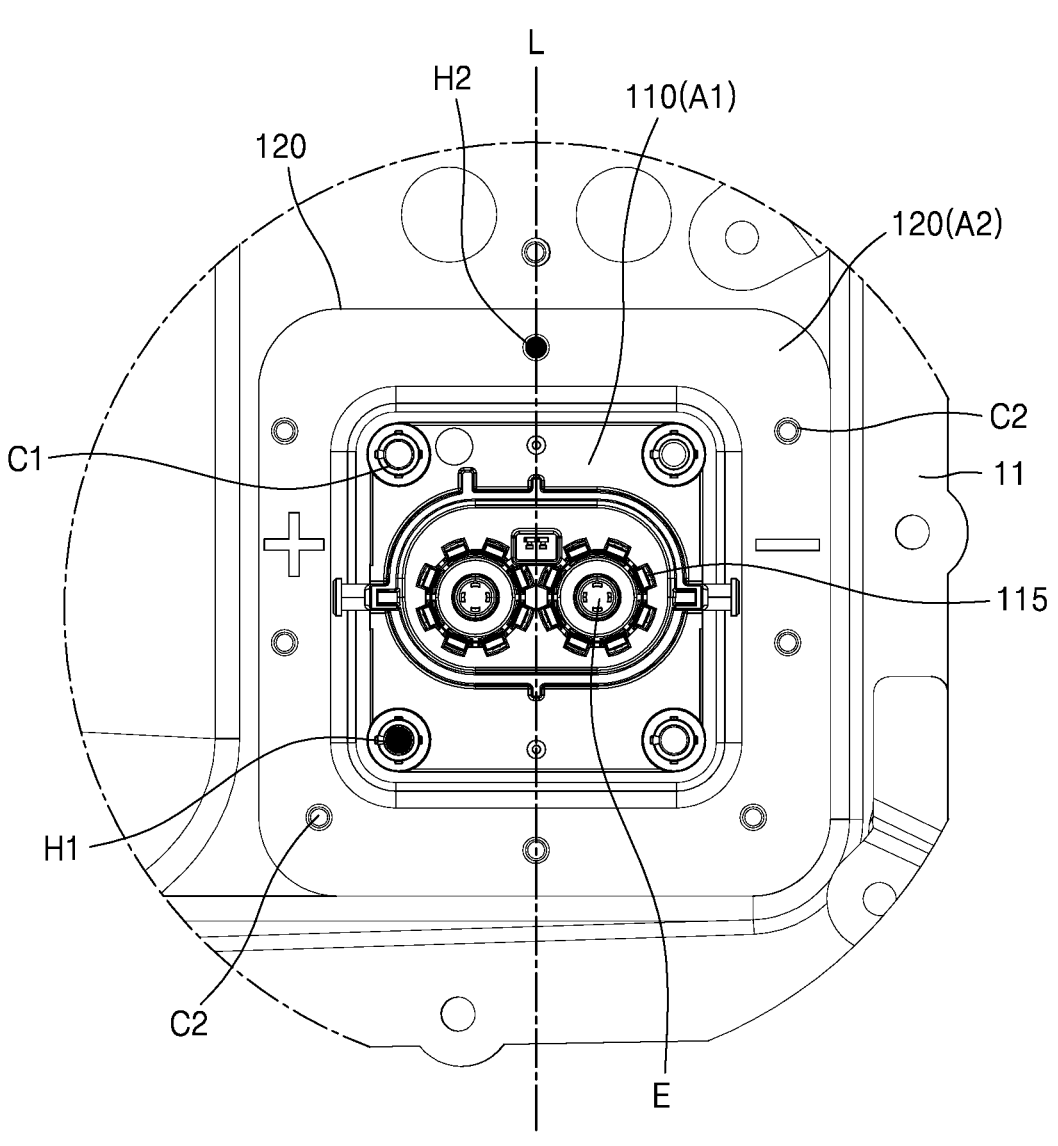
FIG. 11 illustrates the arrangement structure of ground holes and coupling holes applicable in another embodiment of the present disclosure.

FIG. 11 illustrates the arrangement structure of ground holes and coupling holes applicable in another embodiment of the present disclosure.

Referring to the drawings, a first ground hole H1 and a second ground hole H2 may be formed in the inner region A1 and the outer region A2 of the bracket 120, respectively. The first and second ground holes H1 and H2 may form a ground path of the electromagnetic noise and may form an electrical connection between the connection block 150 and the bracket 120 or form an electrical connection between the bracket 120 and the first housing 11.

The first and second ground holes H1 and H2 may form a mechanical fastening in addition to forming the ground path. For this purpose, the first ground hole H1 and the first coupling hole C1 may be formed at four corner portions of the inner region A1 to form a balanced coupling.

The second ground hole H2 may be formed at a different side portion than the second coupling hole C2. The second ground hole H2 may be fastened in a stable state where preliminary coupling is already performed between the bracket 120 and the first housing 11. That is, since all of the other second coupling holes C2 of the outer region A2 are fastened, the second ground hole H2 may be fastened in a state where three side portions of the bracket 120 are already preliminarily coupled and the sealing member 140 (see FIG. 3) may be prevented from being separated in the process of fastening the second ground hole H2. For this purpose, the second ground hole H2 may be formed at a different side portion than another second coupling hole C2 of the outer region A2.

As for a fastening operation, a precedent fastening operation may be performed on three side portions where the second coupling holes C2 are formed, and a subsequent fastening operation may be performed on the other side portion where the second ground hole H2 is formed. As such, since the second ground hole H2 is fastened in the preliminary-coupled state by the precedent fastening, the second ground hole H2 may be stably fastened and the electrical connection through the second ground hole H2 may be more firmly performed. For example, since the second fastening member 182 inserted into the second ground hole H2 may be arranged at a balanced position without a bias to any one side in the second ground hole H2, the conductive contact between the second fastening member 182 and the second ground hole H2 may be stably performed.

The second ground hole H2 may be arranged at any one side portion of the outer region A2 among four side portions of the bracket 120 where final fastening is performed. In this case, the total number of second ground holes H2 and second coupling holes C2 may be arranged differently according to the order of the fastening operation. For example, without the second coupling hole C2, only the second ground hole H2 may be arranged at one side portion where the second ground hole H2 is arranged. In this case, the arrangement of all the holes including the second ground hole H2 and the second coupling hole C2 may be asymmetrical with respect to the central line L of the bracket 120.

Although the present disclosure has been described with reference to the embodiments illustrated in the accompanying drawings, this is merely an example and those of ordinary skill in the art will understand that various modifications and other equivalent embodiments may be derived therefrom. Thus, the spirit and scope of the present disclosure should be defined by the appended claims.

INDUSTRIAL APPLICABILITY

The present disclosure may be applied to various devices using a battery as a rechargeable energy source and using a battery as a driving power supply.

The invention claimed is:

1. A battery module comprising:
a housing accommodating a plurality of battery packs electrically connected to each other; and
a high-voltage connector electrically connected to the plurality of battery packs,
wherein the high-voltage connector includes:
a terminal block exposed outside the housing and including an electrode through which current flows and a shielding portion arranged to surround a periphery of the electrode;
a bracket mediating coupling between the terminal block and the housing; and
a connection block on an opposite side of the bracket with respect to the terminal block, and
the shielding portion is electrically connected to the housing via the connection block, the bracket, and fastening members penetrating respective ground holes of the bracket.

2. The battery module of claim 1, wherein the shielding portion and the connection block are electrically connected to each other through an opening of the bracket,
the connection block is electrically connected to the bracket through a first conductive member, and
the bracket is electrically connected to the housing through a second conductive member.

3. The battery module of claim 2, wherein the bracket includes:
an inner region electrically connected to the connection block and surrounding the opening; and
an outer region electrically connected to the housing and surrounding the inner region.

4. The battery module of claim 3, wherein the first conductive member includes a first fastening member fastened to the connection block through the inner region of the bracket, and
the second conductive member includes a second fastening member fastened to the housing through the outer region of the bracket.

5. The battery module of claim 4, wherein a first ground hole through which the first fastening member passes is formed in the inner region of the bracket, and
a second ground hole through which the second fastening member passes is formed in the outer region of the bracket.

6. The battery module of claim 5, wherein the bracket further includes:
a first coupling hole for coupling with the connection block; and
a second coupling hole for coupling with the housing.

7. The battery module of claim 6, wherein the first ground hole and the first coupling hole are formed in the inner region of the bracket, and
the second ground hole and the second coupling hole are formed in the outer region of the bracket.

8. A battery module comprising:
a housing accommodating a plurality of battery packs electrically connected to each other; and
a high-voltage connector electrically connected to the plurality of battery packs,
wherein the high-voltage connector includes:
a terminal block including an electrode through which current flows and a shielding portion arranged to surround a periphery of the electrode; and
a bracket mediating coupling between the terminal block and the housing and including a first ground hole forming an electrical connection with the shielding portion and a second ground hole forming an electrical connection with the housing.

9. The battery module of claim 8, wherein the bracket includes:
an inner region in which the first ground hole is formed; and
an outer region in which the second ground hole is formed and which surrounds the inner region.

10. The battery module of claim 9, further comprising a connection block on an opposite side of the bracket with respect to the terminal block.

11. The battery module of claim 10, wherein the shielding portion and the connection block are electrically connected to each other through an opening of the bracket,
the first ground hole is electrically connected to the connection block and the shielding portion through a first conductive member fastened to the connection block through the inner region of the bracket surrounding the opening, and
the second ground hole is electrically connected to the housing through a second conductive member fastened to the housing through the outer region of the bracket surrounding the inner region.

12. The battery module of claim 11, wherein the first conductive member includes a first fastening member fastened to the connection block through the inner region of the bracket, and
the second conductive member includes a second fastening member fastened to the housing through the outer region of the bracket.

13. The battery module of claim 10, wherein the bracket further includes:
a first coupling hole for coupling with the connection block; and
a second coupling hole for coupling with the housing.

14. A battery module comprising:
a housing accommodating a plurality of battery packs electrically connected to each other; and
a high-voltage connector coupled to the housing,
wherein the high-voltage connector includes:
an electrode through which current flows, and a shielding portion arranged to surround a periphery of the electrode; and
a bracket including a first ground hole forming an electrical connection with the shielding portion and a second ground hole forming an electrical connection with the housing.

15. The battery module of claim 14, wherein the bracket mediates coupling between the shielding portion and the housing.

16. The battery module of claim 14, further comprising a connection block on an opposite side of the bracket with respect to the shielding portion.

17. The battery module of claim 16, wherein the first ground hole is electrically connected to the connection block and the shielding portion electrically connected to the connection block, through a first conductive member, and the second ground hole is electrically connected to the housing through a second conductive member.

18. The battery module of claim 17, wherein the first conductive member includes a first fastening member fastened to the connection block through an inner region of the bracket, and the second conductive member includes a second fastening member fastened to the housing through an outer region of the bracket.

19. The battery module of claim 16, wherein the bracket further includes:

a first coupling hole for coupling with the connection block; and a second coupling hole for coupling with the housing.

20. The battery module of claim 16, wherein the bracket and the connection block are arranged on opposite sides with respect to a side of the housing where the bracket is coupled, and the connection block is formed to a greater thickness than the bracket.

\* \* \* \* \*